United States Patent [19]
Edgar et al.

[11] Patent Number: 5,298,993
[45] Date of Patent: Mar. 29, 1994

[54] DISPLAY CALIBRATION

[75] Inventors: Albert D. Edgar, Austin, Tex.; James M. Kasson, Menlo Park, Calif.

[73] Assignee: International Business Machines Corporation, Armonk, N.Y.

[21] Appl. No.: 898,582

[22] Filed: Jun. 15, 1992

[51] Int. Cl.⁵ .................................. H04N 17/00
[52] U.S. Cl. ......................................... 348/180
[58] Field of Search .................. 358/139, 10, 406

[56] References Cited

U.S. PATENT DOCUMENTS 3,552,288  1/1971  Corley ............................ 358/10
4,568,975  2/1986  Harshbarger ................. 358/124
4,575,124  3/1986  Morrison ....................... 358/139

Primary Examiner—James J. Groody
Assistant Examiner—Glenton B. Burgess
Attorney, Agent, or Firm—Mark S. Walker

[57] ABSTRACT

Apparatus and method for calibrating a display, such as a raster display, copier, liquid crystal display (LCD) or a printer is disclosed. The processor, under the control of an algorithm, generates adjustment images with a symbol that appears light on dark when misadjusted in one direction; dark on light when misadjusted the other way; and disappears at the point when the display is adjusted correctly. The invention can be used to calibrate brightness, color, gamma and sharpness.

22 Claims, 6 Drawing Sheets

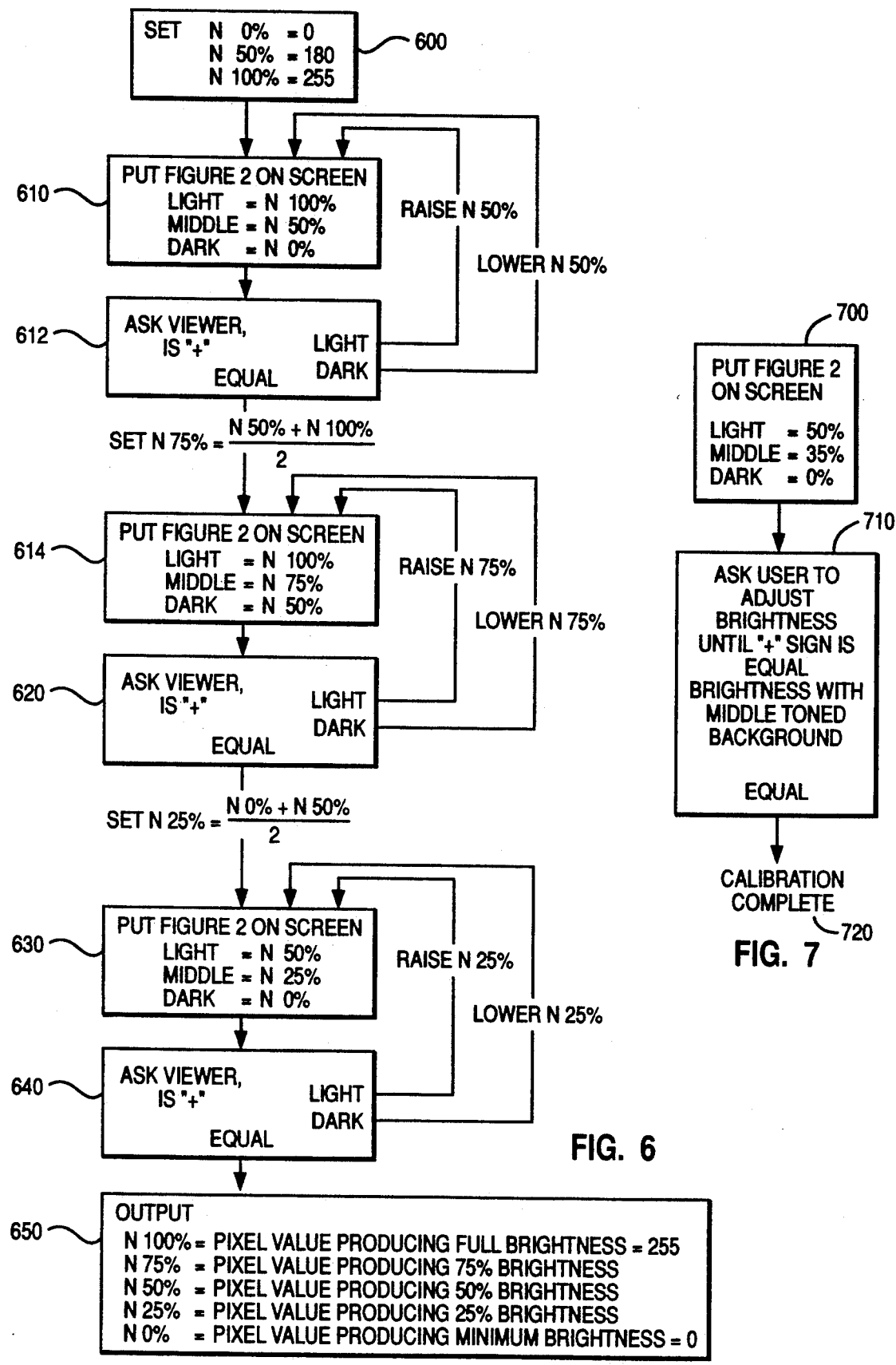

DISPLAY CALIBRATION

A portion of the disclosure of this patent application contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention generally relates to improvements in the calibration of a display and more particularly to calibrating a display without the use of an auxiliary apparatus.

BACKGROUND OF THE INVENTION

The invention provides an innovative approach to calibrating displays. Prior art display calibration systems either required an expensive photometer, or were very subjective. Simple and objective calibration was a desired feature but unattainable in the prior art.

Examples of prior art techniques include U.S. Pat. Nos. 4,091,411; 4,914,506 and 4,101,928 which disclose methods for adjusting saturation and color hue that are unrelated to the subject invention except in a tangential manner.

Aldus Photostyler TM in an example of a personal computer application running under windows that has image enhancement features. Photostyler is a professional color image processing application for use with Microsoft ® Windows. It includes a rudimentary display calibration feature for initializing the display prior to enhancing the images.

U.S. Pat. No. 4,106,846 discloses a mechanical device for unrolling a test pattern over a display screen to adjust color and intensity appropriately. The test pattern is unrolled from the mechanical device on a spring loaded roller that resembles a window shade.

U.S. Pat. No. 4,760,447 discloses a method for verifying the calibration of cameras for photographing images generated from electronic data. The camera is initially calibrated using optical densitometers to bring the camera into a preselected initial calibration. After the initial calibration, a calibration pattern is displayed and photographed to produce a reference photograph. The calibration pattern includes at least two brightness and contrast calibration regions, each region having a background and a plurality of subregions. In each region, the subregions each have progressively greater contrast with the background portion such that the number of visible subregions varies with brightness and contrast settings. The number of visible subregions of each calibration region is recorded. At a subsequent time, the calibration is again verified by displaying the same calibration pattern and comparing the number of visible subregions with the recorded numbers of visible subregions.

None of the prior art references teach an objective instrumentless display calibration system or method.

SUMMARY OF THE INVENTION

Accordingly, it is a primary object of the present invention to provide an instrumentless display calibration system and method.

These and other objects of the present invention are accomplished by the operation of a process in the memory of a processor. The processor, under the control of the process, generates adjustment images with a symbol that appears light on dark when misadjusted in one direction; dark on light when misadjusted the other way; and disappears at the point when the display is adjusted correctly. The invention can be vised to calibrate brightness, color, gamma and sharpness.

The invention performs these functions by displaying two gray patterns on the monitor under test. The first gray is a solid standard shade. The second gray is formed in a half tone pattern of two shades with a large symbol overlaying the first gray. When applied to brightness adjustment, for example, the symbol appears lighter or darker than the background gray depending on the adjustment of the brightness control, and then disappears when the correct adjustment is obtained.

BRIEF DESCRIPTION OF THE DRAWINGS

FIG. 6 is a flowchart setting forth the detailed logic for display measurement in accordance with the subject invention; and FIG. 7 is a flowchart setting forth the detailed logic for calibration in accordance with the subject invention;

DETAILED DESCRIPTION OF THE INVENTION

Figure 1:
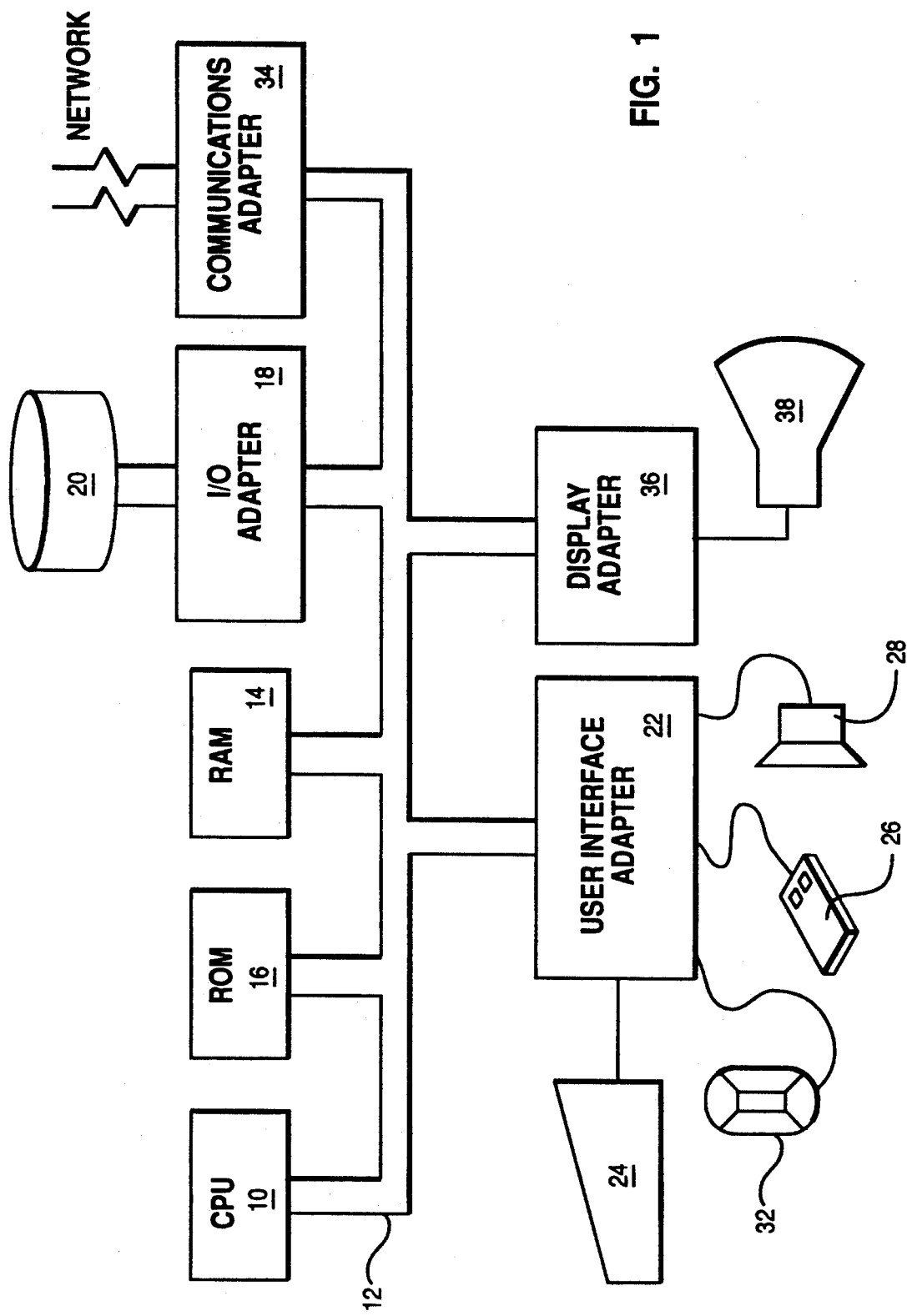
FIG. 1 is a block diagram of a host computer in accordance with the subject invention.

A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 and tape drives 40 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38.

Figure 2:
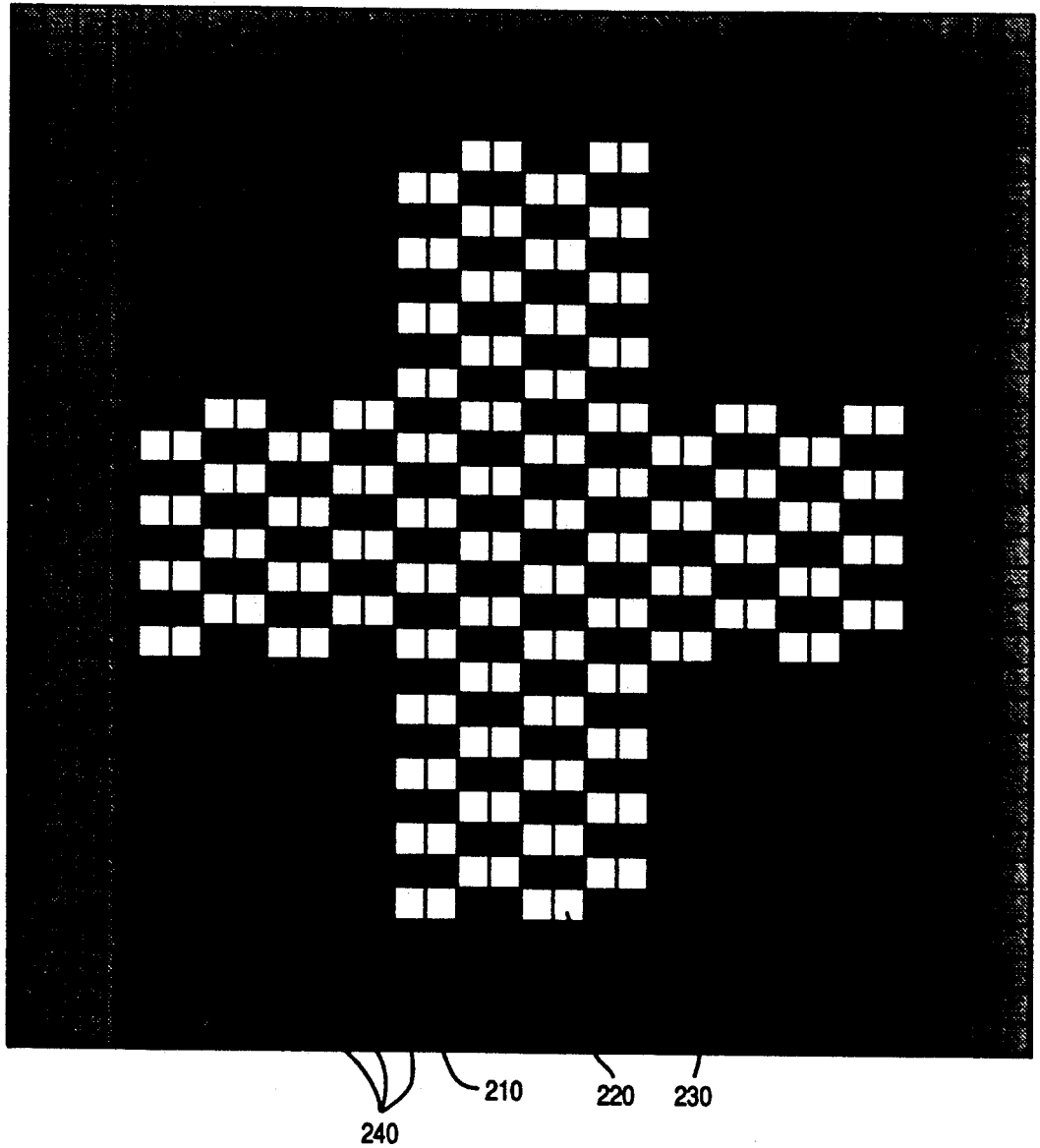
FIG. 2 illustrates a test image in accordance with the subject invention.

FIG. 2 illustrates a test image in accordance with the subject invention. The image has three tones; middle 210, light 220 and dark 230. In an image stored in a digital display adapter, these tones are contained in a plurality of pixels 240 stored in the display memory. Light 220 and dark 230 are selected to bridge a part of the gray scale to be controlled. The light and dark tones are used in a tightly repetitive pattern so when the tones are viewed from a distance, the two tones visually blend into a single tone based on principles of half-tone lithography. A third, middle 210 is selected as the background tone so that when the display is correctly adjusted, the symbol disappears when viewed from a distance.

Figure 3:
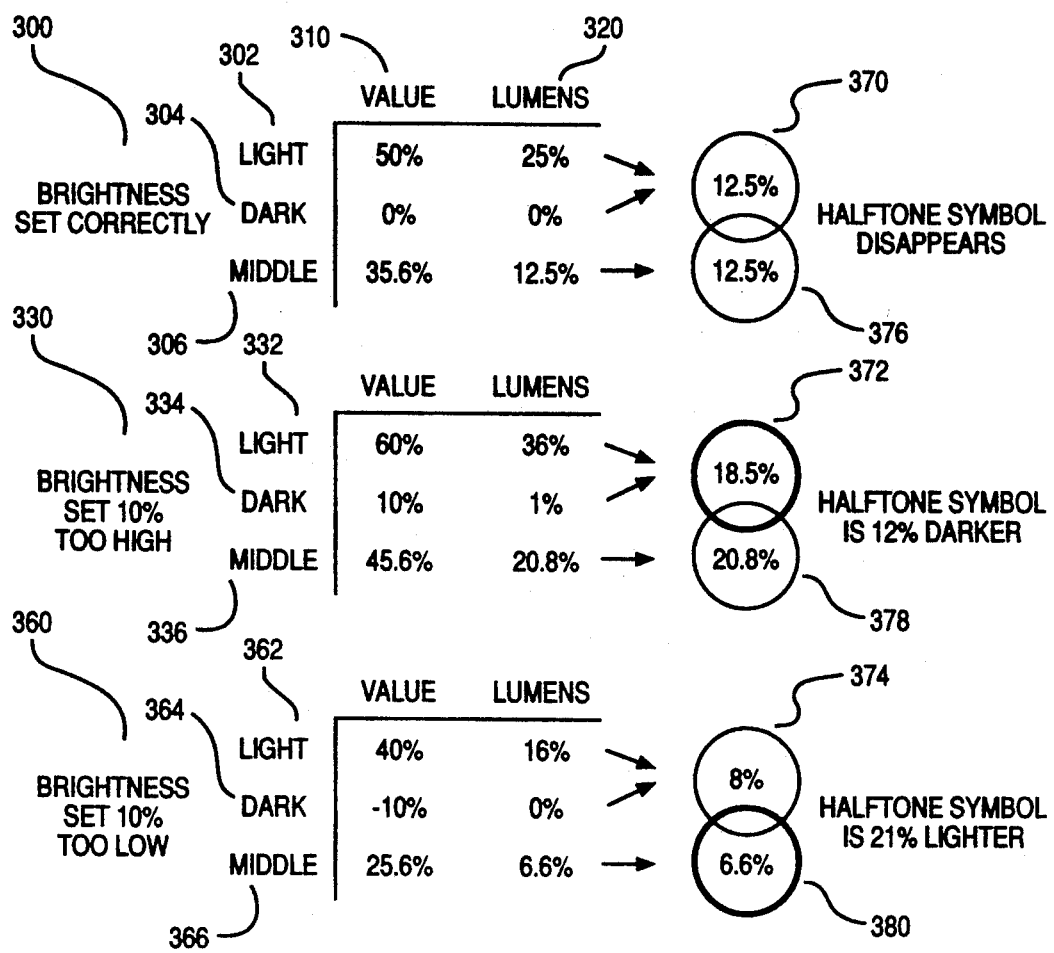
FIG. 3 illustrates various brightness control figures in accordance with the subject invention.

FIG. 3 applies the invention to an adjustment of the video brightness control on a Cathode Ray Tube (CRT) display. Three cases for correct 300, slightly too high 330 and slightly too low 360 brightness are shown. For each of the three tones: light 302, 332 and 362; dark 304, 334 and 364; and middle 306, 336 and 366, the relative numeric pixel value 310 is given relative to 100% white. For example, at 300, the value for light is 50%, dark is 0% and middle is 35.6% of the value of 100% white. The lower part of the grayscale is most sensitive to change by the brightness control, so light and dark are selected to bridge the lower part of the grayscale. Middle Is selected to null the halftone symbol when brightness is correctly set. The brightness control adds a constant voltage to the video signal equivalent to adding a numeric constant to all values. In the example, brightness misadjustments add or subtract 10% from the numeric values. Standard video displays produce a lumens 320 output nearly proportional to the square of the numeric pixel value, so in this example, lumens is the square of the value.

In the area where light and dark form a tightly repetitive pattern, the eye will detect brightness corresponding to the average of lumens from the light and dark, shown in circles 370, 372 and 374. The eye will contrast the brightness with the solid middle adjacent areas 376, 378 and 380. In the case 300 where the brightness is correctly adjusted, the two regions 370 and 376 are equally bright. In the case 330 where the brightness is set 10% too high, the halftone region 372 is 12% darker than the solid middle region 378. And in the case 360 where the brightness is set 10% too low, the halftone symbol 374 emits 21% more lumens than the solid middle region 380.

In practice, the null point is so sensitive that on many displays, the symbol turns a pastel color at null, indicating that all three colors are not in balance. This condition is not a defect of the invention, because the invention exploits the human eye's tendency to average misalignments between colors. In the prior art, separately adjusting the red, green and blue brightness settings under the covers required extreme skill, or a photometer. However, the present invention allows an unskilled observer to observe color misadjustments on monitors that have been calibrated using costly prior art techniques.

The previous example applied the invention to a hardware adjustment. However, the invention is also applicable to a measurement. A plot of brightness versus numeric pixel value for a display can be used in various ways. For example, a palette lookup can precisely correct for display nonlinearities. In one scenario, a monitor is tested, and a correction palette generated for the monitor. Since customers do not have calibration equipment or the expertise to re-calibrate a display, monitor aging, repair or replacement parts could adversely affect the original calibration. Using the subject invention, the brightness curve could be regenerated quickly with the user observing and answering a computer prompt, "is the symbol lighter, darker or equal to the background?"

Figure 4:
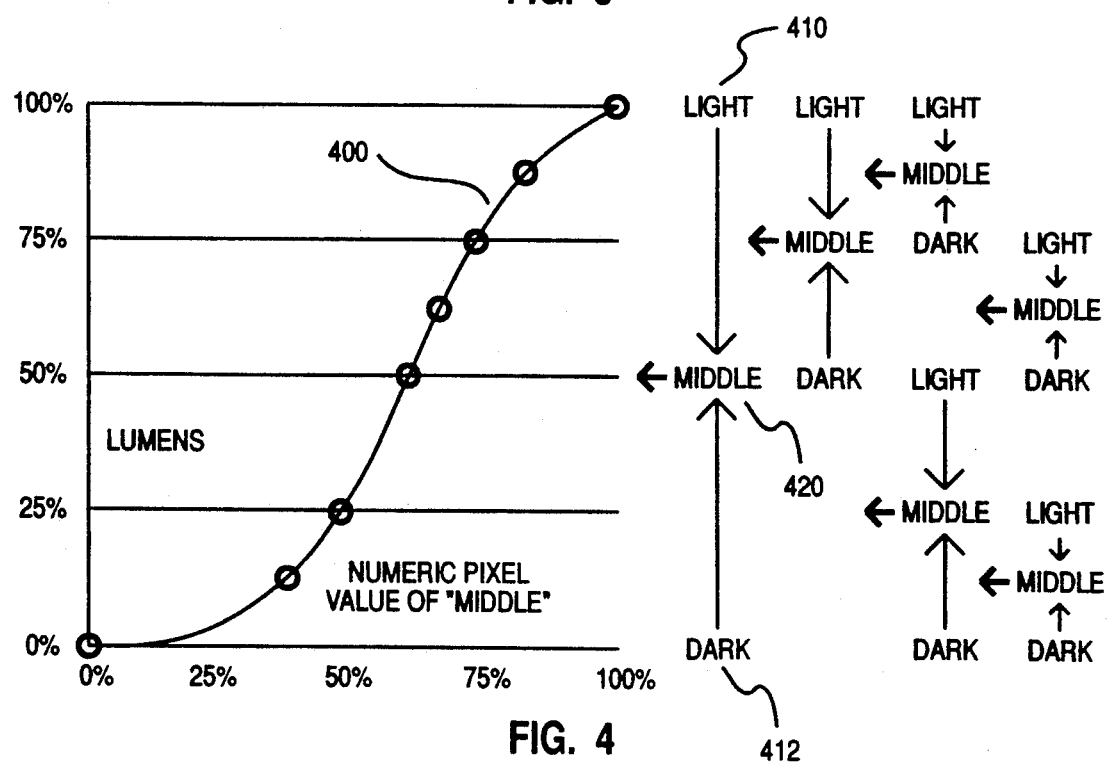
FIG. 4 illustrates a brightness curve in accordance with the subject invention.

To span the entire brightness curve as shown in FIG. 4 at 400, assign light 410 to 100% white and dark 412 to 0% white. With monitor adjustments fixed, a user can adjust middle tone 420 until the symbol disappears. This gives the numeric pixel value that results in a lumens output 50% (middle tone 420) of the way between is white and dark. Next, the numeric value that provides 75%. lumens can be calculated in one of two ways. First, dark can be assigned to the value just found to give 50% lumens as above, and leave light assigned to 100% white. Alternatively, a halftone pattern may be used that has 75% white pixels and 25% black pixels. In either case, the null for middle occurs at 75% lumens. The carve can be further articulated employing the same technique to whatever granularity required.

Variations to the invention's application abound. A halftone pattern can be virtually any ratio of light to dark, for example ⅓. The pattern and background can be entirely in one color, like green, to measure or adjust that single color independent of the other colors. Alternatively, the edge of a symbol can be diffused to avoid visually confusing aliasing around the edges. The three tones could vary across the display, the question then being where does the null occur, not at what time or adjustment setting. The invention works with any display, including an image printer, giving a quick, accurate way to calibrate image printers or copiers without requiring expensive densitometers and operator training.

Figure 5:
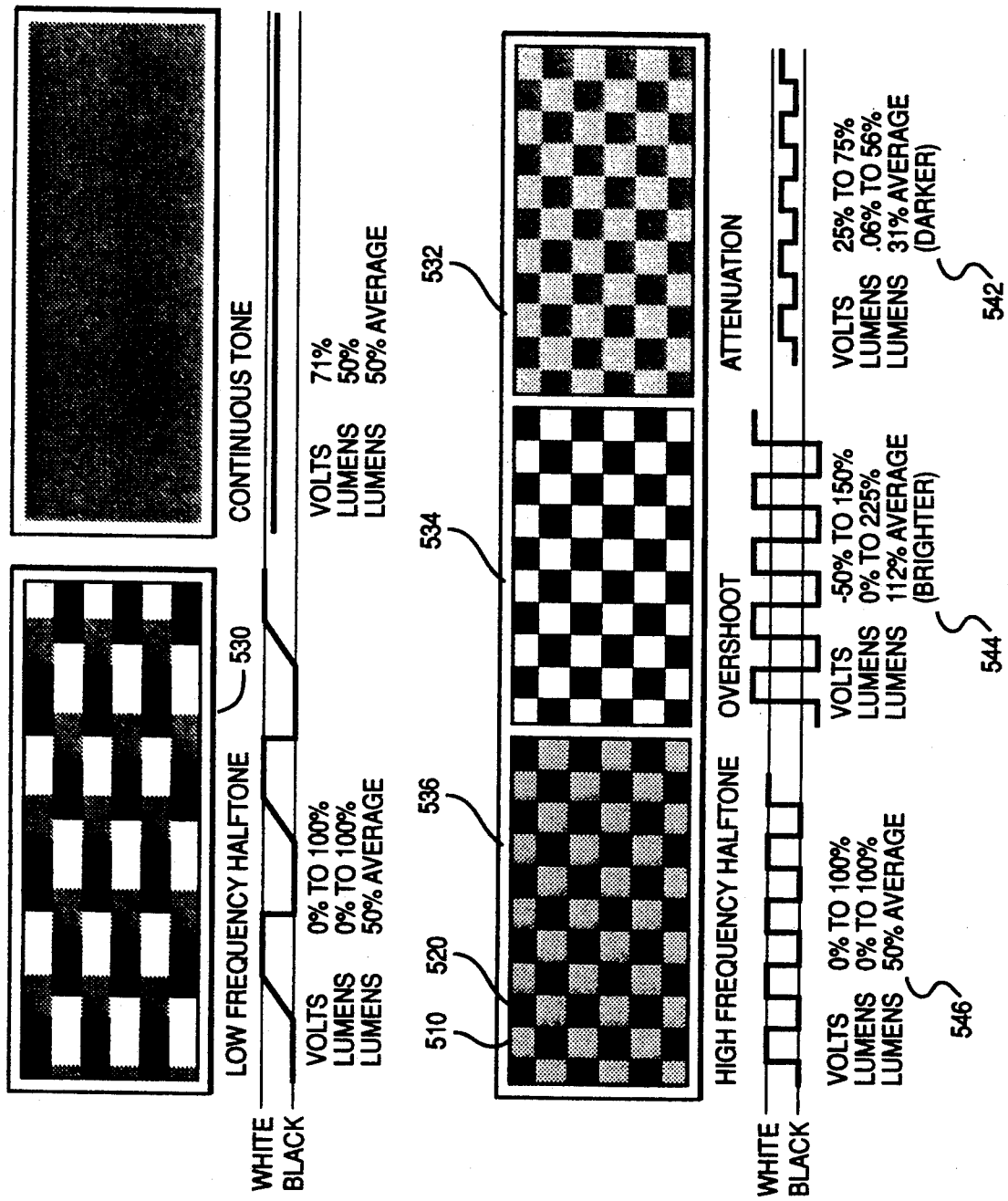
FIG. 5 illustrates a video amplifier application of the invention in accordance with the subject invention.

A final example, set forth in FIG. 5, uses the invention to measure frequency response of a video amplifier. In this case the dither pattern places light 510 and dark 520 tones of different widths to exercise the video amplifier of a horizontally scanned display at different frequencies. At high frequencies, light and dark merge if the amplifier response falls as in screen 532, and the halftone pattern darkens 542. If the amplifier overshoots as in screen 534, the light value becomes lighter and the dark value becomes lighter. The actual display lumens can be approximated by squaring the display voltage for each, giving a net lighter screen 544. In this may the brightness is proportional to frequency response, and the response can be measured by selecting a solid shade of gray to match, or adjusted until the halftone pattern matches a preselected solid shade of gray.

The invention only measures the electronic frequency response independent of all other optical or electron beam diffusions. This technique requires linear amplifier response. For the most accurate measurement of the brightness curve in the previous examples, the frequency effect of this example should be eliminated by selecting a halftone dither pattern with a lower frequency in the direction of the scan, such as illustrated in FIG. 5 at 530 in the low frequency halftone where the more serious overshoot is buffered with a 70% transition from black to white. On a progressive monitor every other line can alter between light and dark. However, on an interlaced display, flicker will be experienced if low frequency alteration is not employed.

DETAILED LOGIC

FIG. 6 is a flowchart setting forth the detailed logic in accordance with the subject invention. Processing commences at function block 600 where percentages are initialized appropriately. Then, in function block 610, the grid shown in FIG. 2 is displayed and other variables are initialized. A test is, performed next at decision block 612 to determine the user's perception of the display and percentages are adjusted appropriately based on the user's input. The 75% value is an output of this initial processing.

This procedure is repeated in function is blocks 614 and a similar test is performed by the user at decision block 620. The output of this second set of processing is a value for 25%.

The procedure discussed above is repeated at function block 630 and a similar test is performed at 640 to adjust to user perception. Then, the final outputs are prepared in function block 650 for use in completing the calibration processing.

FIG. 7 is a flowchart setting forth the detailed logic for calibration in accordance with the subject invention. At function block 700, the calibration figure is presented and then at decision block 710, the user is requested to adjust to their perception. Calibration is complete at 720.

Figure 8:
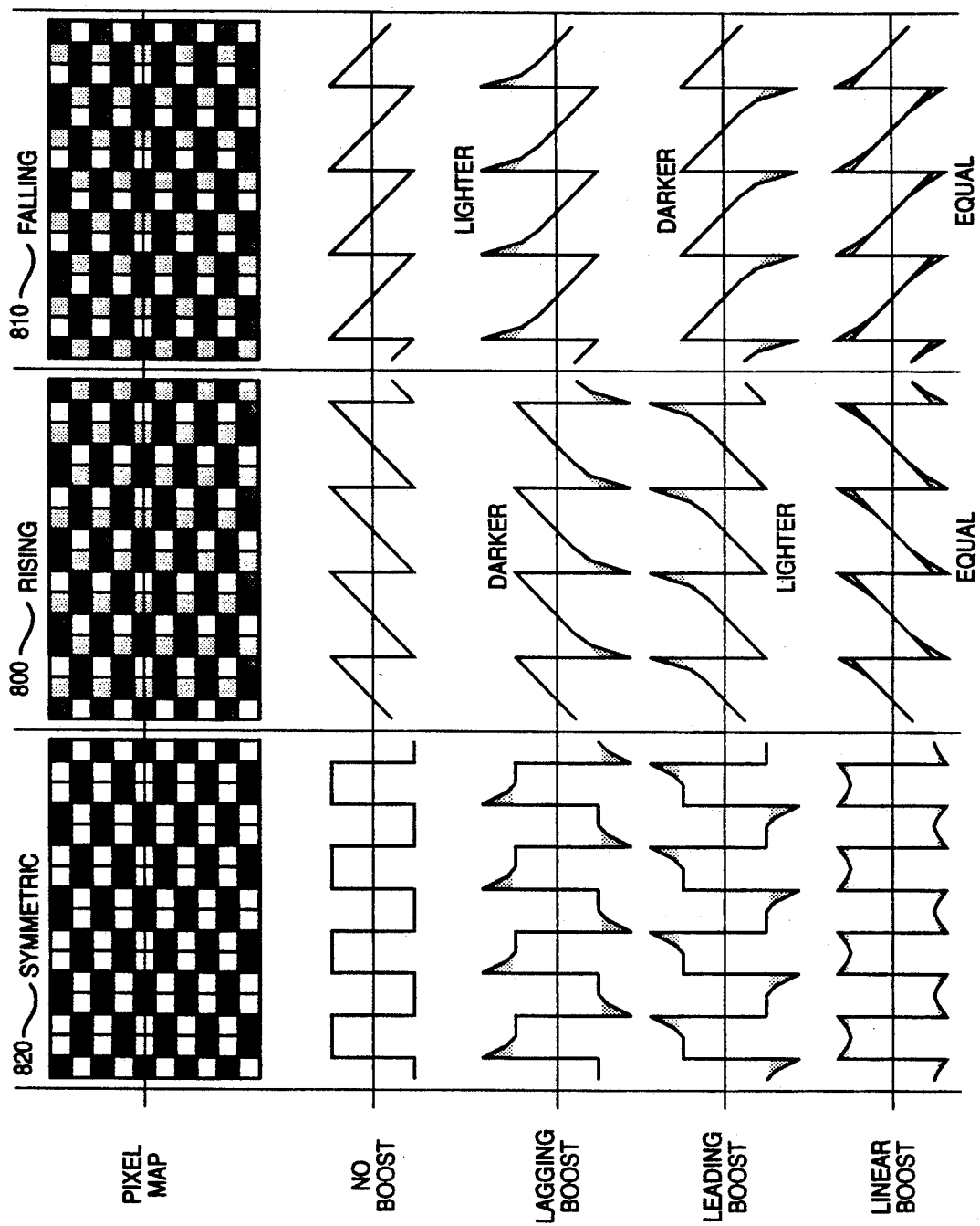
FIG. 8 illustrates a phase component of the frequency response of a display application of the invention in accordance with the subject invention.

FIG. 8 illustrates a phase component of the frequency response of a display application of the invention in accordance with the subject invention. The phase component of the frequency response of a display system can also be objectively sensed using the invention. In this case, both the foreground symbol and the background consist of grids. For one, the grid is a sawtooth with a rising slope as shown in column 800. For the other, the grid is a sawtooth with a falling slope as shown in column 810. If the phase is lagging, then one will appear brighter than the other. If a leading phase, then the opposite one will appear brighter. Finally, if the phase is linear then both will appear of equal brightness. This sense can be used to align an audio circuit or to control a digital correction that predistorts the image to compensate for the display.

Pixel maps are given for the cases of rising 800 and falling 810 sawtooth patterns, and for the case of asymmetric square wave 820 for comparison. A scan line across these pixel maps translates into display control voltages such as they would appear on an oscilloscope. The effects of leading, lagging and linear phases are also shown. In the case of the sawtooth patterns, the overshoot in the direction of white makes the image lighter, while the overshoot in the direction of blackness has little effect. This phenomena is because once a light is turned off, pushing a voltage lower cannot make black any blacker.

Program Listing in Accordance with the Invention

```c
/****************************************************************/
/*                                                              */
/*  MODULE NAME    PLUS                                         */
/*                                                              */
/*  DESCRIPTIVE NAME   Show a plus sign                         */
/*  (C) Copyright IBM Corporation 1992                          */
/****************************************************************/
/*
*/

/****************** SYSTEM INCLUDES *****************************/
#include "stdio.h"
#include "stdlib.h"
#include "malloc.h"
#include "doscall.h"
#include "dos.h"
#include "fcntl.h"
#include "sys\types.h"
#include "sys\stat.h"
#include "io.h"
#include "math.h"

/****************** USER INCLUDES *******************************/
#include "c:\mapping\cc\plus\plus.cnc"
#include "c:\mapping\cc\os2afi.h"

/****************** AVC DEFINITIONS *****************************/
DIR_HDR dir_hdr;            /* Directory -- header */
DIR_ENT dir_ent;            /* Directory entry */
IMG_HDR img_hdr;            /* Hdr 0200 -- IMAGE */
```

```
/*************** GLOBAL DATA & DEFINITIONS ****************/
FILE          *stream;
unsigned char huge  plus_im[480][640];
unsigned char       palette[256][4];

#define BAD_INPUT 12

/*************** STATIC DATA & DEFINITIONS ****************/
static HOPEN_DATA    hopen_data = {3,0,1};
static HQDPS_DATA    hqdps_data = {6,0,0,0};
static HINIT_DATA    hinit_data = {2,0};
static HLDPAL_DATA   hldpal_data;
static HBBW_DATA     hbbw_data;
static HBBCHN_DATA   hbbchn_data;
static HCLOSE_DATA   hclose_data = {0};

/******************* FUNCTIONS ****************************/
int   main(int, char *[]);
int   getplus();
int   getnew(int *);
int   show();
void  putline(int, int, char far *, int);

/**********************************************************/
/* FUNCTION NAME: main                                    */
/* DESCRIPTION: Read the image and process input.         */
/* PARAMETERS: nbr_args, arg_list                         */
/*    RETURNS: retcode - 0 ok, else error                 */
/*    INPUT: PLUS.IMG                                     */
/*    OUTPUT: None                                        */
/**********************************************************/
int main(nbr_args, arg_list)
int   nbr_args;
char  *arg_list[];
{
  int   retcode;
  long  lbytes;
  int   j;
  int   stop;
  char  ch[2];

retcode = 0;

printf("\nPLUS Program - Version 1.0\n");
  printf("\n  IBM Confidential\n\n");
```

```
/* Get command line parameters, syntax-check, and put into variables. */ if (nbr_args > 1)              /* if arguments */
  {
    retcode = TOO_MANY_PARMS;
    goto error_exit0;
  } printf("\nINSTRUCTIONS:\n");
printf("After the image is displayed, either:\n\n");
printf("1.) Type 3 numbers, separated by a space, and then press ENTER.\n");
printf("    Example: 0 63 6 (ENTER)\n");
printf("    plus is 63, background is 0 and 6.\n");
printf("2.) Type x to Exit PLUS.\n\n");

/* Read in the PLUS image */ printf("Getting the PLUS image.\n");
  retcode = getplus();
  if (retcode)
    goto error_exit0;

show_it:
  printf("Showing the PLUS image.\n");
  retcode = show();              /* Show the PLUS image */
  if (retcode)
    goto error_exit1;

stop = NO;
  while (stop == NO)
{
  retcode = getnew(&stop);       /* Evaluate entered data */
  if (retcode == BAD_INPUT)
    {
    HCLOSE(&hclose_data);
    printf("Error entering the 3 numbers. Want to try again? (Y/N) ");
    ch[0] = (char)getch();
    ch[1] = '\0';
    printf("\n");                /* next line, please */
    if (strcmpi(ch, "y") == 0)
      {
        retcode = 0;
        goto show_it;
      }
    else
      goto error_exit0;
    }
```

```
        if (retcode)
            goto error_exit1;
        }

HCLOSE(&hclose_data);
    goto main_exit;

error_exit1:
    HCLOSE(&hclose_data);
error_exit0:
    switch (retcode)
        {
        case BAD_LUT:
            printf("Open error on file PLUS.IMG.\n");
            break;

case READ_ERROR:
            printf("Read error occurred.\n");
            break;

case ERROR_8514A:
            printf("Error during write to 8514/A screen.\n");
            DOSEXIT(1,1);
            break;

case TOO_MANY_PARMS:
            printf("Too many parameters are specified.\n");
            break;

case BAD_INPUT:
            printf("\nError in user input.\n");
            break;
        default:
            printf("Internal error occurred.\n");
            break;
        } main_exit:
    return(retcode);
}

/*****************************************************************/
/* FUNCTION NAME: getplus                           */
/* DESCRIPTION: Read the PLUS map and image.        */
/* PARAMETERS: none                                 */
```

```
/*     RETURNS: retcode - 0 ok, else error           */
/*     INPUT: none                                   */
/*     OUTPUT: palette, plus_im                      */
/***************************************************/
int getplus()
{
  int          retcode;
  unsigned int bytesread;
  int          yy;
  int          j;

retcode = 0;

/* Open the PLUS file */ stream = fopen("plus.img", "rb");
  if (stream == NULL)              /* error opening file */
    {
    retcode = BAD_LUT;
    goto get_exit;                 /* quit */
    }

/* Read PLUS map */ bytesread = 0;
  for (j = 0; j < 256; j++)
    {
    bytesread += fread((char *)&palette[j][0], 1, 1, stream);
    bytesread += fread((char *)&palette[j][2], 1, 1, stream);
    bytesread += fread((char *)&palette[j][1], 1, 1, stream);
    }
  if (bytesread != 768)
    {
    retcode = READ_ERROR;
    goto get_error1;               /* quit */
    }

/* Read PLUS image */ for (yy = 0; yy < 480; yy++)
    {
    bytesread = fread((char huge *)&plus_im[yy][0], 1, 640, stream);
    if (bytesread != 640)
      {
      retcode = READ_ERROR;
      goto get_error1;             /* quit */
      }
    }
```

}

/* Close the PLUS file */ get_error1:
 fclose(stream);

get_exit:
 return(retcode);
}

/*********************************************************************/
/* FUNCTION NAME: getnew                                           */
/* DESCRIPTION: Get new values for the image.                      */
/* PARAMETERS: stop                                                */
/* RETURNS: retcode = 0 ok, else error                             */
/* INPUT: palette                                                  */
/* OUTPUT: none                                                    */
/*********************************************************************/
int getnew(stop)
int *stop;
{
 int retcode;
 int numfields;
 int field1;
 int field2;
 int field3;
 char bye[32];

retcode = 0;
 bye[0] = '\0';

numfields = scanf("%d %d %d", &field1, &field2, &field3);
 if (numfields != 3)
   {
    numfields = scanf("%s", bye);
 if (numfields != 1)
   retcode = BAD_INPUT;
 else
    if (strcmpi(bye, "x") == 0)
      *stop = YES;
    else
      retcode = BAD_INPUT;
 goto new_exit;
   }

```
if ((field1 > 63) || (field2 > 63) || (field3 > 63))
  {
  retcode = BAD_INPUT;
  goto new_exit;
  } palette[0][0] = field1 << 2;
palette[0][1] = field1 << 2;
palette[0][2] = field1 << 2;
palette[1][0] = field2 << 2;
palette[1][1] = field2 << 2;
palette[1][2] = field2 << 2;
palette[2][0] = field3 << 2;
palette[2][1] = field3 << 2;
palette[2][2] = field3 << 2;

hldpal_data.length  = 10;
hldpal_data.pal_id  = 0;
hldpal_data.rest    = 0;
hldpal_data.first   = 0;
hldpal_data.count   = 256;
hldpal_data.address = (char far *)&palette[0][0];
HLDPAL(&hldpal_data);

new_exit:
  return(retcode);
}

/***************************************************************/
/* FUNCTION NAME: show                                          */
/* DESCRIPTION: Display the mapped image in 8514/A mode.        */
/* PARAMETERS: none                                             */
/* RETURNS: retcode - 0 ok, else error                          */
/* INPUT: im                                                    */
/* OUTPUT: none                                                 */
/***************************************************************/
int show()
{
  int      retcode;
  int      yy;
  char far *scanptr;
  int      value;

retcode = 0;
```

```c
HOPEN(&hopen_data);              /* open adapter */
if (hopen_data.iflags != 0)      /* if not successful */
   {
   retcode = ERROR_8514A;
   goto show_exit;
   }

HQDPS(&hqdps_data);              /* get state data information */

DOSALLOCSEG(hqdps_data.size, (unsigned far *)&hinit_data.segment, 0);
HINIT(&hinit_data);              /* initialize state */ hldpal_data.length    = 10;
hldpal_data.pal_id    = 0;
hldpal_data.rest      = 0;
hldpal_data.first     = 0;
hldpal_data.count     = 256;
hldpal_data.address   = (char far *)&palette[0][0];
HLDPAL(&hldpal_data);            /* load palette */ for (yy = 0; yy < 480; yy++)
   {
   scanptr = (char far *)&plus_im[yy][0];
   if (FP_OFF(scanptr) > (0xFFFF - 640))
      {
      value = 0x10000L - FP_OFF(scanptr);
      putline(0, yy, scanptr, value);
      scanptr = (char far *)&plus_im[yy][value];
      putline(value, yy, scanptr, 640 - value);
      }
   else
      putline(0, yy, scanptr, 640);
   } show_exit:
 return(retcode);
}

/*****************************************************************/
/* FUNCTION NAME: putline                                        */
/* DESCRIPTION: Write each scan line on the 8514/A screen.       */
/* PARAMETERS: scanrow, scanline, scanlen                        */
/*    RETURNS: none                                              */
/*     INPUT: scancol, scanrow, scanline, scanlen                */
/*    OUTPUT: none                                               */
```

```
/****************************************************/
void putline(scancol, scanrow, scanline, scanlen)
int       scancol;
int       scanrow;
char far  *scanline;
int       scanlen;
{ hbbw_data.length       10;
   hbbw_data.format       8;
   hbbw_data.width        scanlen;
   hbbw_data.height       1;
   hbbw_data.coord.x_coord    scancol;
   hbbw_data.coord.y_coord    scanrow;
   HBBW(&hbbw_data);              /* Set the image dimensions */ hbbchn_data.length      6;
   hbbchn_data.address     scanline;
   hbbchn_data.len         scanlen;
   HBBCHN(&hbbchn_data);          /* Set image data pointer */
}
/****************************************************/
/*                                                  */
/* INCLUDE NAME      plus.enc                       */
/* DESCRIPTIVE NAME  Common mapping information     */
/* COPYRIGHT CLASSIFICATION - IBM CONFIDENTIAL      */
/* STATUS   Version 0 Release 0                     */
/* CHANGE ACTIVITY                                  */
/* Date      Name        PR    Description          */
/* 09/12/90  Christy Conway      New file           */
/*                                                  */
/****************************************************/
/* general equates */
#define UCHR    unsigned char
#define UINT    unsigned int
#define ULNG    unsigned long
#define K64     65536L
#define K32     32768
#define M256    256
#define COUNT   0
#define LOOP    1
#define NO      0
#define YES     1
#define TYPE_BMP 0x4D42
```

```c
#define BMP_B   0x42
#define BMP_M   0x4D
#define MAP_PM  0
#define MAP_PMA 1
#define MAP_AL  2
#define NOTYPE  0
#define TEMP    1
#define AVC     2
#define BMP     3
#define MODE12  0x0012
#define MODE13  0x0013
#define MODE113 0x0113
#define MODE411 0x0411
#define MODE412 0x0412
#define MODE565 0x0501

/* error messages */
#define NEED_HELP          1
#define BAD_LUT            2
#define OUT_OF_MEMORY      3
#define SEEK_ERROR         4
#define READ_ERROR         5
#define WRITE_FAILED       6
#define BAD_IMAGE          7
#define WRITE_FAILED_IMAGE 8
#define ERROR_8514A        9
#define TOO_MANY_PARMS     10
#define NOT_AVC            11
#define NOT_BMP            12
#define BAD_REPORT         13
#define UNKNOWN_IMAGE      14
#define IMAGE_TOO_BIG      15
#define ERROR_VIO_SLOCK    16
#define BAD_IMAGE_MODE     17
#define BAD_IMAGE_TYPE     18
define IMAGE_COMPRESSED   19 struct dirheader              /* AVC file directory header */
{
  char sig[8];                /* Signature  " ! A ! V ! C ! " */
  UINT dvers;                 /* Version/Mod = 0x0000 */
  UINT typ;                   /* Font file type = 0x0400 */
  ULNG siz;                   /* Total file size (bytes) */
  ULNG spc;                   /* Total free space in file (bytes) */
  int  dir;                   /* Nbr of directory entries */
  int  dactiv;                /* Active directory entries */
```

```
    ULNG  dserl;              /* DB serial nbr */
    ULNG  dvdf;               /* VDF pointer */
    UCHR  gen;                /* Starting generation nbr */
    UCHR  kpt;                /* Number of generations kept */
    UINT  dcopy;              /* Copyright flags */
    char  dname[64];          /* ASCIIz reference code (pad null) */
    char  dnote[32];          /* Copyright notice */
    long  dtime;              /* Time stamp */
    char  dres[24];           /* Reserved - 00 */
};

define DIR_HDR struct dirheader struct direntry               /* Directory entry */
{
    UINT  typ;                /* Object type (0000h = null entry) */
    UINT  sub;                /* Object sub-type */
    UINT  obstat;             /* Object status = 0000 */
    UINT  sfx;                /* Size of object header */
    ULNG  svr;                /* Size of data section in memory */
    ULNG  siz;                /* Object size (compressed in file) */
    ULNG  obserl;             /* DB serial nbr */
    ULNG  off;                /* VDF or file offset */
    ULNG  oboff;              /* R/W offset (work field) */
    int   obesch;             /* Escape file handle - 0 */
    int   obesct;             /* Tempy escape file handle - 0 */
};

define DIR_ENT struct direntry struct mapheader              /* Map header -- object 0201 */
{
    char  obj_id[8];          /* Visual ID (7 chars plus 0) */
    int   obj_ver;            /* Version number */
    int   cmp_typ;            /* Compression type */
    char  rsv0000[4];         /* Reserved - 00 */
    int   mapclr;             /* Number of colors in map */
    UCHR  coding;             /* Color coding type */
    UCHR  gstep;              /* Distance between rgb values */
    int   redmax;             /* Highest red value */
    int   grnmax;             /* Highest green value */
    int   blumax;             /* Highest blue value */
    int   rsvbas;             /* Start of reserved colors */
    int   rsvcnt;             /* Number of reserved colors */
    int   huebas;             /* Start of hues/intesities */
    int   huecnt;             /* Number of hues */
```

```
    int  ntys;          /* Number of intensities */
    int  cusbas;        /* Start of custom color index */
    int  cuscnt;        /* Number of custom colors */
    int  bakbas;        /* Start of background colors */
    int  bakcnt;        /* Number of background colors */
    int  curone;        /* Cursor one pel value map entry idx */
    int  curtwo;        /* Cursor two pel value map entry idx */
    int  clear;         /* Transparent color */
    int  border;        /* Border pel value map entry index */
    UINT drclr;         /* Draw color pel value */
    int  drnty;         /* Draw color intensities */
    int  hxntys;        /* Product of hues & intensities */
    char cusfix;        /* Map type (0 = custom 1 = fixed) */
    char rsv3[21];      /* Reserved space */
};

define MAP_HDR struct mapheader struct imageheader       /* Image header -- object 0200 */
{
    char obj_id[8];     /* Visual ID (7 chars plus 0) */
    int  obj_ver;       /* Version number */
    int  cmp_typ;       /* Compression type */
    char rsv0000[4];    /* Reserved - 00 */
    int  dvc_mod;       /* Device mode */
    int  pln_pel;       /* Number of pels in a scan line */
    int  pln_row;       /* Number of scan lines in the plane */
    int  pln_byt;       /* Number of bytes in a scan line */
    int  pel_bit;       /* Number of bits in a pel */
    char clrcod;        /* Color coding: 0, 1, 2, etc */
    char g_step;        /* Gun value step */
    int  red_max;       /* Maximum red gun value */
    int  grn_max;       /* Maximum green gun value */
    int  blu_max;       /* Maximum blue gun value */
    char pelcode;       /* Pel format code: bits 000000xx */
    char pln_r3;        /* (reserved -- 00h) */
    int  xaspect;       /* X component of aspect ratio */
    int  yaspect;       /* Y component of aspect ratio */
    int  wnd_pof;       /* Starting pel offset within scan */
    int  wnd_rof;       /* Scan line number within window */
    int  wnd_pel;       /* Window width in pels */
    int  wnd_row;       /* Window height in scan lines */
    char pln_res[18];   /* (reserved -- 00h) */
    char cur_res[14];   /* (reserved -- 00h) */
};

#define IMG_HDR struct imageheader
```

```c
struct textheader              /* Text header -- object 0204 */
{
    char  obj_id[8];           /* Visual ID (7 chars plus 0) */
    int   obj_ver;             /* Version number */
    int   cmp_typ;             /* Compression type */
    char  rsv0000[4];          /* Reserved - 00 */
    int   cbf_max;             /* Maximum number of text head groups */
    int   cbf_cnt;             /* Actual number of text head groups */
    int   cbf_gln;             /* Length of head group entry */
    int   cbf_x;               /* Safety area ULC pel offset */
    int   cbf_y;               /* Safety area ULC scan line */
    int   cbf_w;               /* Safety area width */
    int   cbf_h;               /* Safety area height */
    int   cbf_fmax;            /* Maximum number of text fields */
    int   cbf_txfb;            /* Actual number of text fields */
    int   cbf_fln;             /* Length of field directory entry */
    int   cbf_smax;            /* Max nbr of entries in string block */
    int   cbf_txsb;            /* Actual nbr entries in string block */
    int   cbf_sln;             /* Length of string block entry (2) */
    UCHR  cbf_vars;            /* Variable field existence bits */
                               /* 0-Itl 1-Trigger 2-Ouput 3-Update */
    char  rsv0204[5];          /* Reserved - 00 */
};

define TXT_HDR struct textheader struct textgroup               /* Head group -- object 0204 data 1 */
{
    char  descrip[26];         /* Group description */
    int   pos;                 /* Positioning: absolute/relative */
    int   lin;                 /* Left indentation */
    int   rin;                 /* Right indentation */
    int   sbef;                /* Space before */
    int   sbtw;                /* Space between */
    int   saft;                /* Space after */
    char  rsv0204d1[10];       /* Reserved - 00 */
};

define TXT_GRP struct textgroup struct chrset                  /* Text field -- object 0204 data 2 */
{
    int   cclr;                /* Draw color */
    int   cint;                /* Draw color AA depth */
    char  rsv0204d2c1[2];      /* Reserved - 00 */
    int   outclr;              /* Outline color */
```

```
    int   oint;                 /* Outline AA depth */
    char  outf;                 /* Outline enable flag */
    char  outd;                 /* Outline depth */
    int   shdclr;               /* Shadow color */
    int   sint;                 /* Shadow AA depth */
    char  shf;                  /* Shadow enable flag */
    char  shx;                  /* Shadow x depth */
    char  shy;                  /* Shadow y-depth */
    char  rsv0204d2c2;          /* Reserved - 00 */
    char  slf;                  /* Slant enable flag */
    char  slant;                /* Slant */
    char  rsv0204d2c3[2];       /* Reserved - 00 */
};

struct textfield                /* Text field -- object 0204 data 2 */
{
    int   hgrp;                 /* Head group number */
    int   toff;                 /* Text offset in string block */
    char  avaname[32];          /* AVA field name */
    int   avatyp;               /* AVA field type */
    char  rsv0204d2a[6];        /* Reserved - 00 */
    ULNG  fntdbser;             /* DB serial number of font file */
    ULNG  fntdbvdf;             /* VDF pointer for font file */
    UINT  fntsubt;              /* Object subtype of font */
    char  font[10];             /* Font file name */
    UCHR  ptsize;               /* Point size */
    UCHR  aalvls;               /* Number of AA levels */
    char  rsv0204d2b[8];        /* Reserved - 00 */
    UCHR  activ;                /* Active/group field flag */
    char  rsv0204d2c;           /* Reserved - 00 */
    int   anchorx;              /* X coordinate of anchor point */
    int   anchory;              /* Y coordinate of anchor point */
    int   adjustx;              /* X offset of field micro adjustment */
    int   adjusty;              /* Y offset of field micro adjustment */
    int   width;                /* Total width of string box */
    int   hgt;                  /* Total height of string box */
    int   elevn;                /* Elevation of string box */
    int   awidth;               /* Actual occupied string box width */
    int   maxlin;               /* Maximum number of lines */
    int   actlin;               /* Actual number of lines */
    int   maxword;              /* Maximum word width */
    int   margint;              /* Top margin size */
    int   marginb;              /* Bottom margin size */
    int   marginl;              /* Left margin size */
    int   marginr;              /* Right margin size */
```

```
int    txstart;           /* Text start position in string box */
int    curpos;            /* Current position within string */
int    stglen;            /* Length of text string in text blk */
char   rsv0204d2d[10];    /* Reserved - 00 */
struct chrset n;          /* Normal character set attributes */
struct chrset h;          /* Highlight character set attributes */
char   tmode;             /* Current mode of text display */
char   act;               /* Current character set */
UINT   eclr;              /* Erase color */
char   lockw;             /* Width lock */
char   lockh;             /* Height lock */
int    sx;                /* Intercharacter spacing */
int    sw;                /* Interword spacing */
int    sy;                /* Interline spacing */
char   just;              /* Fdb_justification flag */
char   rsv0204d2e;        /* Reserved - 00 */
UINT   bakclr;            /* Background color */
char   rsv0204d2f[8];     /* Reserved - 00 */
char   modifs[24];        /* Modification section */
};

#define TXT_FLD struct textfield
```

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. An apparatus for detecting characteristics of a display, comprising:
    (a) means for displaying a grid pattern;
    (b) means for displaying a grid having a continuous tone field adjacent to the grid pattern; and
    (c) means for varying frequency response of the display until the grid pattern and the grid having a continuous tone field have the same brightness.

2. Apparatus as recited in claim 1, wherein the grid pattern blends with the grid having a continuous tone field when the display is properly calibrated.

3. Apparatus as recited in claim 1, including means for adjusting brightness of the display.

4. Apparatus as recited in claim 1, including means adjusting contrast of the display.

5. Apparatus as recited in claim 1, including means for adjusting sharpness of the display.

6. Apparatus as recited in claim 1, wherein the display is a liquid crystal display.

7. Apparatus as recited in claim 1, wherein the display is a raster display.

8. Apparatus as recited in claim 1, wherein the display is a printer.

9. Apparatus as recited in claim 1, wherein the display is a copier.

10. A method for detecting characteristics of a display, comprising the steps of:
    (a) displaying a grid pattern;
    (b) displaying a grid having a continuous tone field adjacent to the grid pattern; and
    (c) varying frequency response of the display until the grid pattern and the grid having a continuous tone field have the same brightness.

11. A method as recited in claim 9, wherein the grid pattern blends with the grid having a continuous tone field when the display is properly calibrated.

12. A method as recited in claim 11, including the step of adjusting brightness of the display.

13. A method as recited in claim 11, including the step of adjusting contrast of the display.

14. A method as recited in claim 11, including the step of adjusting sharpness of the display.

15. An apparatus for detecting characteristics of a display, comprising:
    (a) means for displaying a grid pattern consisting of alternating first and second tones along a scan direction of the display grouping first tones together;
    (b) means for displaying a grid having a continuous tone field adjacent to the grid pattern; and
    (c) means for detecting when the grid pattern and the grid having a continuous tone field have the same brightness.

16. An apparatus for detecting characteristics of a display as recited in claim 15, wherein pixels between the alternating, adjacent first and second tones along a scan direction of the display correspond to an intermediate tone.

17. A method for detecting characteristics of a display, comprising the steps of:
    (a) displaying a grid pattern consisting of alternating first and second tones along a scan direction of the display grouping first tones together;

(b) displaying a grid having a continuous tone field proximal to the grid pattern; and (c) detecting when the grid pattern and the grid having a continuous tone field have the same brightness.

18. A method for detecting characteristics of a display as recited in claim 17, wherein pixels between the alternating, adjacent first and second tones along a scan direction of the display correspond to an intermediate tone.

19. A method for detecting the density curve of a display, comprising the steps of:

(a) displaying a grid pattern consisting of a first tone and a second tone;

(b) displaying a third grid having a third tone adjacent to the grid pattern;

(c) varying the third tone until the grid pattern and the third tone have the same brightness;

(d) setting either the first tone or second tone equal to the third tone; and (e) varying the third tone until the grid pattern and the third grid having a third tone having the same brightness.

20. An apparatus for detecting the density curve of a display, comprising:

(a) means for displaying a grid pattern consisting of a first tone and a second tone;

(b) means for displaying a third grid having a third tone adjacent to the grid pattern;

(c) means for varying the third tone until the grid pattern and the third grid having a third tone have the same brightness;

(d) means for setting either the first tone or second tone equal to the third tone; and (e) means for varying the third tone until the grid pattern and the third grid having a third tone have the same brightness.

21. A method for detecting phase characteristics of a display, comprising the steps of:

(a) displaying a first grid pattern consisting of alternating first and second tones along a scan direction of the display;

(b) displaying a second grid consisting of alternating third and fourth tones along a scan direction of the display;

(c) displaying intermediate tones between the transitions between first to second tones along a scan direction of the display in the first grid;

(d) displaying intermediate tones between the transitions between third to fourth tones along a scan direction of the display in the second grid; and (e) detecting differences in brightness between the first and second grids.

22. A method for detecting phase characteristics of a display, comprising:

(a) means for displaying a first grid consisting of alternating first and second tones along a scan direction of the display;

(b) means for displaying a second grid consisting of alternating third and fourth tones along a scan direction of the display;

(c) means for displaying intermediate tones between the transitions between first to second tones along a scan direction of the display in the first grid;

(d) means for displaying intermediate tones between the transition between third to fourth tones along a scan direction of the display in the second grid; and (e) means for detecting a difference in brightness between the first and second grids.

* * * * *